United States Patent
Kim et al.

(10) Patent No.: US 12,425,999 B2
(45) Date of Patent: Sep. 23, 2025

(54) METHOD AND APPARATUS FOR TIMING SYNCHRONIZATION IN COMMUNICATION SYSTEM

(71) Applicant: Electronics and Telecommunications Research Institute, Daejeon (KR)

(72) Inventors: Ji Hyung Kim, Daejeon (KR); Mi Young Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 476 days.

(21) Appl. No.: 17/957,432

(22) Filed: Sep. 30, 2022

(65) Prior Publication Data

US 2023/0105278 A1 Apr. 6, 2023

(30) Foreign Application Priority Data

Oct. 1, 2021 (KR) .................. 10-2021-0131218
Sep. 30, 2022 (KR) .................. 10-2022-0125535

(51) Int. Cl.
*H04W 56/00* (2009.01)
*H04W 16/28* (2009.01)
*H04W 76/19* (2018.01)
*H04W 84/06* (2009.01)

(52) U.S. Cl.
CPC ......... *H04W 56/005* (2013.01); *H04W 16/28* (2013.01); *H04W 76/19* (2018.02); *H04W 84/06* (2013.01)

(58) Field of Classification Search
CPC ... H04W 56/005; H04W 76/19; H04W 16/28; H04W 84/06; H04W 36/0033; H04W 56/0045; H04W 74/08; H04B 7/185; H04B 7/18563
See application file for complete search history.

(56) References Cited

U.S. PATENT DOCUMENTS

| | | | |
|---|---|---|---|
| 9,900,856 B2 | 2/2018 | Wu et al. | |
| 10,826,595 B2 | 11/2020 | Wang et al. | |
| 2019/0254064 A1* | 8/2019 | Islam | H04W 74/04 |

(Continued)

FOREIGN PATENT DOCUMENTS

| | | |
|---|---|---|
| CN | 111565448 | 5/2021 |
| WO | 2016/209332 | 12/2016 |

(Continued)

*Primary Examiner* — Mewale A Ambaye
(74) *Attorney, Agent, or Firm* — KILE PARK REED & HOUTTEMAN PLLC

(57) ABSTRACT

An operation method of a terminal in a communication system may include: estimating a propagation delay between the terminal and a first satellite, the first satellite being connected to the terminal and a base station of the communication system; estimating a terminal-specific TA value based on the propagation delay; transmitting, to the base station, a terminal-specific TA report based on the terminal-specific TA value; and performing update of a first TA value for communication with the base station based on the terminal-specific TA value, wherein a time point at which the update of the first TA value is performed is determined based on a first response of the base station to the terminal-specific TA report.

17 Claims, 5 Drawing Sheets

(56) References Cited

U.S. PATENT DOCUMENTS

| | | | |
|---|---|---|---|
| 2020/0107369 A1* | 4/2020 | Jeon | H04W 74/006 |
| 2020/0132593 A1* | 4/2020 | Schwarz | G01J 3/0291 |
| 2020/0196263 A1* | 6/2020 | Heyn | H04W 56/0005 |
| 2020/0351957 A1 | 11/2020 | Kim | |
| 2021/0006328 A1* | 1/2021 | Kim | H04W 72/23 |
| 2022/0132593 A1 | 4/2022 | Ren et al. | |
| 2022/0353837 A1* | 11/2022 | Hosseinian | H04W 56/0045 |
| 2023/0105278 A1* | 4/2023 | Kim | H04B 7/18563 |
| | | | 370/503 |
| 2023/0118008 A1* | 4/2023 | Kim | H04W 76/15 |
| | | | 370/329 |
| 2023/0269685 A1* | 8/2023 | Park | H04W 56/0005 |
| | | | 370/350 |

FOREIGN PATENT DOCUMENTS

| | | |
|---|---|---|
| WO | 2020/034564 | 2/2020 |
| WO | 2021/221477 | 11/2021 |

* cited by examiner

METHOD AND APPARATUS FOR TIMING SYNCHRONIZATION IN COMMUNICATION SYSTEM

CROSS-REFERENCE TO RELATED APPLICATIONS

This application claims priority to Korean Patent Applications No. 10-2021-0131218 filed on Oct. 1, 2021 and No. 10-2022-0125535 filed on Sep. 30, 2022 with the Korean Intellectual Property Office (KIPO), the entire contents of which are hereby incorporated by reference.

BACKGROUND

1. Technical Field

The present disclosure relates to a timing synchronization technique in a communication system, and more specifically, to a technique for efficiently performing timing synchronization between communication nodes such as a base station and a terminal performing long-distance communication.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

The NR communication network may provide communication services to terminals located in terrestrial sites. Recently, the demand for communication services for planes, drones, etc., which are located in the non-terrestrial places, or the demand for communication services through satellites is increasing. To this end, techniques for a non-terrestrial network (NTN) are being discussed.

Meanwhile, in a mobile communication network, a propagation delay of signals between each terminal and a base station may vary due to a different position of each terminal. In order to reduce interference due to different propagation delays of terminals, a timing advance (TA) procedure may be used. In particular, in the NTN, a round trip time delay (RTT) between a terminal and a base station may be large, and a difference between RTT values corresponding to the respective terminals may be large. In addition, in the NTN, Doppler shifts due to movement of non-terrestrial communication nodes such as satellites may appear large. In a communication network having a large RTT value and a large Doppler shift, such as the NTN, a technique for efficiently performing a TA procedure may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a timing synchronization method and apparatus for enhancing efficiency of a timing synchronization procedure between a base station and a terminal in a communication system including an NTN.

According to an exemplary embodiment of the present disclosure for achieving the above-described objective, an operation method of a terminal in a communication system may comprise: estimating a propagation delay between the terminal and a first satellite, the first satellite being connected to the terminal and a base station of the communication system; estimating a terminal-specific timing advance (TA) value based on the propagation delay; transmitting, to the base station, a terminal-specific TA report based on the terminal-specific TA value; and performing update of a first TA value for communication with the base station based on the terminal-specific TA value, wherein a time point at which the update of the first TA value is performed is determined based on a first response of the base station to the terminal-specific TA report.

The terminal-specific TA report may include at least one of information on the terminal-specific TA value, information on a sum of the terminal-specific TA value and a second TA value updated based on a timing advance command (TAC) received from the base station, information on the first TA value updated based on the terminal-specific TA value, or combinations thereof.

Information on the terminal-specific TA value may include at least one of information on an amount of change in the terminal-specific TA value, information on an amount of change in a sum of the terminal-specific TA value and a second TA value updated based on a TAC received from the base station, and information on an amount of change in the first TA value updated based on the terminal-specific TA value, or combinations thereof.

The time point at which the update of the first TA value is performed may correspond to a second time point spaced apart by a preset first offset value from a first time point at which the first response is received.

The time point at which the update of the first TA value is performed may be determined based on a result of comparing a sum of the updated first TA value and a second offset for a medium access control (MAC) control element (CE) with a third offset indicated by the first response.

The first response may include at least one of a first signal indicating whether the terminal-specific TA report is normally received, a second signal requesting transmission of a random access (RA) preamble for the update of the first TA value, a third signal requesting to perform update of the terminal-specific TA value and to perform new terminal-specific TA reporting based on the updated terminal-specific TA value, or combinations thereof.

The time point at which the update of the first TA value is performed may correspond to a second slot spaced apart by a first offset from a first slot in which the first response is received from the base station.

The operation method may further comprise, after performing the update, receiving a fourth signal indicating that the first satellite is to be replaced by a second satellite connected to the base station; estimating a target terminal-specific TA value between the second satellite and the terminal; and performing update of the first TA value for communication with the base station based on the target terminal-specific TA value, wherein the fourth signal includes at least one of information on a first time point at which a service of the first satellite for the terminal is terminated, information for timing synchronization with the second satellite, or combinations thereof.

According to another exemplary embodiment of the present disclosure for achieving the above-described objective, an operation method of a terminal in a communication system may comprise: receiving a first signal indicating that a first satellite connected to the terminal and a base station of the communication system is to be replaced by a second satellite connected to the base station; estimating a propagation delay between the second satellite and the terminal; estimating a terminal-specific timing advance (TA) value based on the propagation delay; and performing update of a first TA value for communication with the base station based on the terminal-specific TA value, wherein the first signal includes at least one of information on a first time point at which a service of the first satellite for the terminal is terminated or information for timing synchronization with the second satellite, and the update of the first TA value is performed at a second time point determined based on the first signal.

The first signal may include information on the first time point, and the second time point at which the update of the first TA value is performed may be configured after the first time point identified based on the first signal.

The first signal may include information for timing synchronization with the second satellite, the information for timing synchronization with the second satellite may include information on a position of the second satellite, and the estimating of the terminal-specific TA value may comprise: estimating the propagation delay between the second satellite and the terminal based on the information on the position of the second satellite; and estimating the terminal-specific TA value based on the propagation delay.

The first signal may include information for timing synchronization with the second satellite, the information for timing synchronization with the second satellite may include information on a second common TA value for the second satellite which is distinguished from a first common TA value for the first satellite, and the performing update of the first TA value may comprise: updating the first TA value based on the second common TA value and the terminal-specific TA value.

The first TA value may be determined based on at least the terminal-specific TA value and a second TA value updated based on a timing advance command (TAC) received from the base station, and the performing update of the first TA value may comprise: setting the second TA value to 0 at the second time point; receiving a first TAC from the base station; updating the second TA value based on the received first TAC; and performing update of the first TA value based on the terminal-specific TA value and the updated second TA value.

According to yet another exemplary embodiment of the present disclosure for achieving the above-described objective, a terminal in a communication system may comprise a processor, wherein the processor may cause the terminal to: identify a beam failure with respect to a first beam configuring a first service link between the terminal and a first satellite connected to a base station of the communication system; configure a second service link between the first satellite and the terminal for communication with the base station through a beam failure recovery (BFR) procedure according to the identified beam failure; and perform update of a first TA value for communication with the base station based on information obtained through the BFR procedure, wherein the update of the first TA value is performed at a first time point determined based on the BFR procedure.

The BFR procedure may include a random access (RA) procedure, and the first time point may be determined to be after a second time point at which the terminal transmits a first preamble in uplink according to the RA procedure.

The first TA value may be determined based at least on information on a common TA value provided from the base station, the information on the common TA value may include information on a beam-specific parameter, and in the performing of the update of the first TA value, the processor may cause the terminal to: identify a parameter corresponding to a second beam configuring the second service link from the information on the beam-specific parameter; update the common TA value based on the parameter corresponding to the second beam; and update the first TA value based on the updated common TA value.

The first TA value may be determined based at least on information on a common TA value provided from the base station, and in the performing of the update of the first TA value, the processor may cause the terminal to: estimate a common TA value for the second service link to be identical to a common TA value for the first service link; and calculate the first TA value based on the information obtained through the BFR procedure and the common TA value for the second service link.

According to the exemplary embodiments of the method and apparatus for timing synchronization in a communication system, even when a propagation delay on a feeder link and/or a service link in an NTN is very large, a timing synchronization procedure between a base station and a terminal can be efficiently performed. Through this, in the communication system including the NTN, communication quality deterioration due to interference due to the large propagation delay and Doppler shifts due to fast movements of satellites, etc. can be alleviated, whereby the performance of the communication system can be improved.

DETAILED DESCRIPTION OF THE EMBODIMENTS

Figure 1:
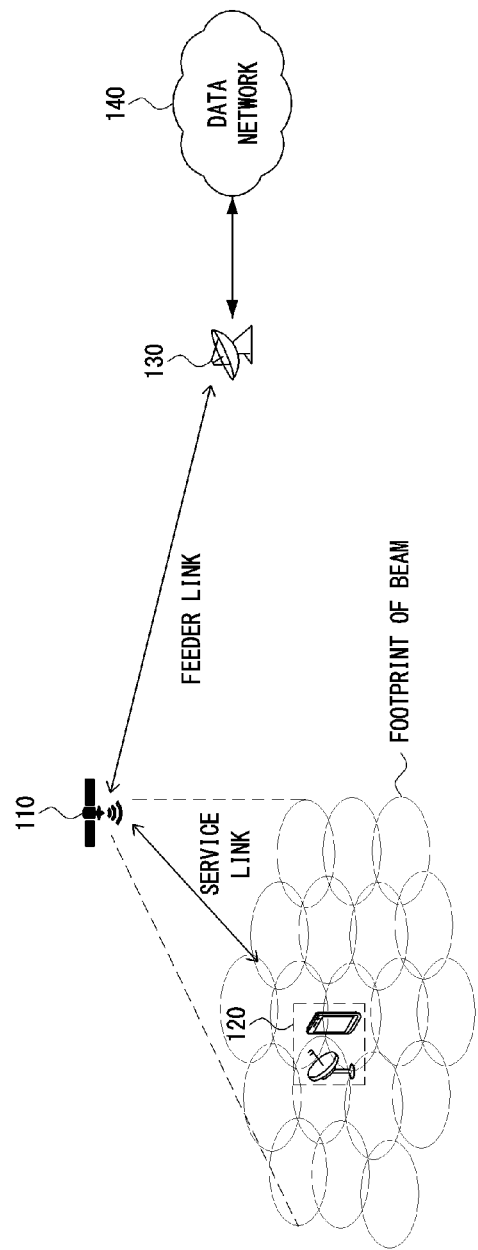
FIG. 1 is a conceptual diagram illustrating a first exemplary embodiment of a non-terrestrial network.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

A communication network to which exemplary embodiments according to the present disclosure are applied will be described. The communication system may be a non-terrestrial network (NTN), a 4G communication network (e.g., long-term evolution (LTE) communication network), a 5G communication network (e.g., new radio (NR) communication network), a B5G communication network (e.g., 6G mobile communication network), or the like. The 4G communication network and the 5G communication network may be classified as terrestrial networks.

The NTN may operate based on the LTE technology and/or the NR technology. The NTN may support communications in frequency bands below 6 GHz as well as in frequency bands above 6 GHz. The 4G communication network may support communications in the frequency band below 6 GHz. The 5G communication network may support communications in the frequency band below 6 GHz as well as in the frequency band above 6 GHz. The communication network to which the exemplary embodiments according to the present disclosure are applied is not limited to the contents described below, and the exemplary embodiments according to the present disclosure may be applied to various communication networks. Here, the communication network may be used in the same sense as the communication system.

FIG. 1 is a conceptual diagram illustrating a first exemplary embodiment of a non-terrestrial network.

Referring to FIG. 1, a non-terrestrial network (NTN) may include a satellite 110, a communication node 120, a gateway 130, a data network 140, and the like. The NTN shown in FIG. 1 may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g., a user equipment (UE) or a terminal) located on a terrestrial site and a communication node (e.g., an airplane, a drone) located on a non-terrestrial place. A service link may be established between the satellite 110 and the communication node 120, and the service link may be a radio link. The satellite 110 may provide communication services to the communication node 120 using one or more beams. The shape of a footprint of the beam of the satellite 110 may be elliptical.

The communication node 120 may perform communications (e.g., downlink communication and uplink communication) with the satellite 110 using LTE technology and/or NR technology. The communications between the satellite 110 and the communication node 120 may be performed using an NR-Uu interface. When dual connectivity (DC) is supported, the communication node 120 may be connected to other base stations (e.g., base stations supporting LTE and/or NR functionality) as well as the satellite 110, and perform DC operations based on the techniques defined in the LTE and/or NR specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. The communications between the gateway 130 and the core network may be performed based on an NG-C/U interface.

Alternatively, a base station and the core network may exist between the gateway 130 and the data network 140. In this case, the gateway 130 may be connected with the base station, the base station may be connected with the core network, and the core network may be connected with the data network 140. The base station and core network may support the NR technology. The communications between the gateway 130 and the base station may be performed based on an NR-Uu interface, and the communications between the base station and the core network (e.g., AMF, UPF, SMF, and the like) may be performed based on an NG-C/U interface.

Figure 2:
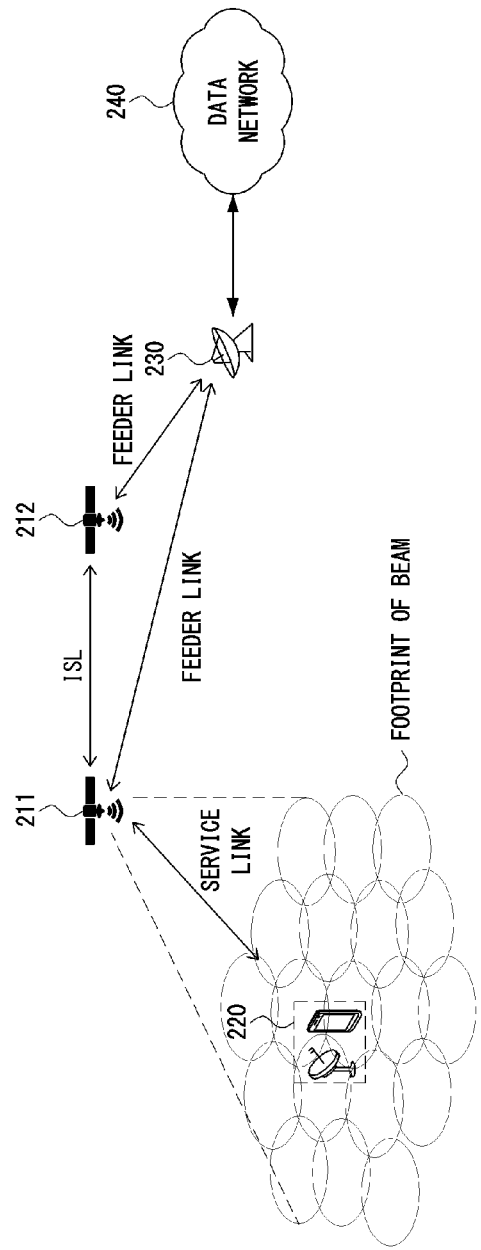
FIG. 2 is a conceptual diagram illustrating a second exemplary embodiment of a non-terrestrial network.

FIG. 2 is a conceptual diagram illustrating a second exemplary embodiment of a non-terrestrial network.

Referring to FIG. 2, a non-terrestrial network may include a first satellite 211, a second satellite 212, a communication node 220, a gateway 230, a data network 240, and the like. The NTN shown in FIG. 2 may be a regenerative payload based NTN. For example, each of the satellites 211 and 212 may perform a regenerative operation (e.g., demodulation, decoding, re-encoding, re-modulation, and/or filtering operation) on a payload received from other entities (e.g., the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g., UE or terminal) and a non-terrestrial communication node (e.g., airplane or drone). A service link (e.g., radio link) may be established between the satellite 211 and communication node 220. The satellite 211 may provide communication services to the communication node 220 using one or more beams.

The communication node 220 may perform communications (e.g., downlink communication or uplink communication) with the satellite 211 using LTE technology and/or NR technology. The communications between the satellite 211 and the communication node 220 may be performed using an NR-Uu interface. When DC is supported, the communication node 220 may be connected to other base stations (e.g., base stations supporting LTE and/or NR functionality) as well as the satellite 211, and may perform DC operations based on the techniques defined in the LTE and/or NR specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily.

The communications between each of the satellites 211 and 212 and the gateway 230 may be performed based on an NR-Uu interface or an SRI. The gateway 230 may be connected to the data network 240. There may be a core network between the gateway 230 and the data network 240. In this case, the gateway 230 may be connected to the core network, and the core network may be connected to the data network 240. The core network may support the NR technology. For example, the core network may include AMF, UPF, SMF, and the like. The communications between the gateway 230 and the core network may be performed based on an NG-C/U interface.

Alternatively, a base station and the core network may exist between the gateway 230 and the data network 240. In this case, the gateway 230 may be connected with the base station, the base station may be connected with the core network, and the core network may be connected with the data network 240. The base station and the core network may support the NR technology. The communications between the gateway 230 and the base station may be performed based on an NR-Uu interface, and the communications between the base station and the core network (e.g., AMF, UPF, SMF, and the like) may be performed based on an NG-C/U interface.

Meanwhile, entities (e.g., satellites, communication nodes, gateways, etc.) constituting the NTNs shown in FIGS. 1 and 2 may be configured as follows.

Figure 3:
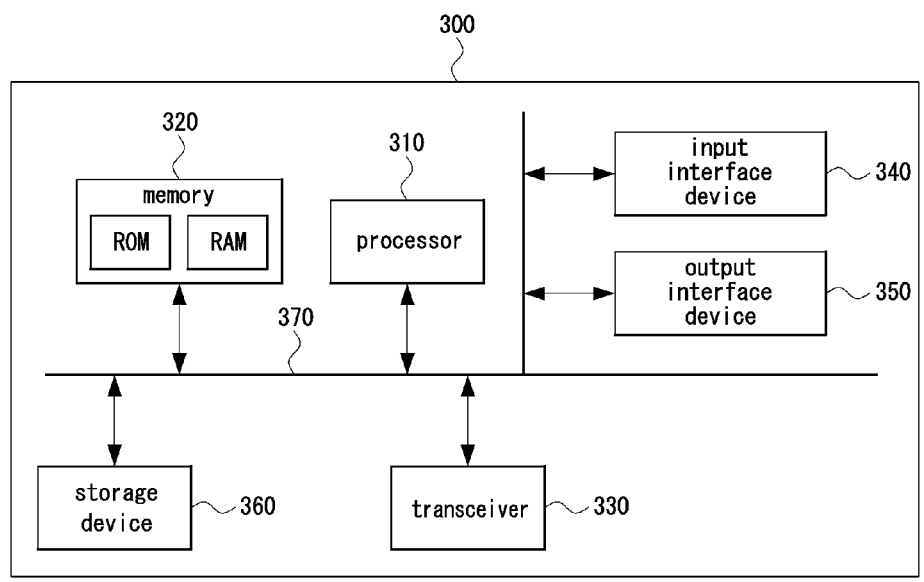
FIG. 3 is a block diagram illustrating a first exemplary embodiment of an entity constituting a non-terrestrial network.

FIG. 3 is a block diagram illustrating a first exemplary embodiment of an entity constituting a non-terrestrial network.

Referring to FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other. However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present invention are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, scenarios in the NTN may be defined as shown in Table 1 below.

TABLE 1

|  | NTN shown in FIG. 1 | NTN shown in FIG. 2 |
| --- | --- | --- |
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1 is a GEO satellite (e.g., a GEO satellite that supports a transparent function), this may be referred to as 'scenario A'. When the satellites 211 and 212 in the NTN shown in FIG. 2 are GEO satellites (e.g., GEOs that support a regenerative function), this may be referred to as 'scenario B'.

When the satellite 110 in the NTN shown in FIG. 1 is an LEO satellite with steerable beams, this may be referred to as 'scenario C1'. When the satellite 110 in the NTN shown in FIG. 1 is an LEO satellite having beams moving with the satellite, this may be referred to as 'scenario C2'. When the satellites 211 and 212 in the NTN shown in FIG. 2 are LEO satellites with steerable beams, this may be referred to as 'scenario D1'. When the satellites 211 and 212 in the NTN shown in FIG. 2 are LEO satellites having beams moving with the satellites, this may be referred to as 'scenario D2'.

Parameters for the scenarios defined in Table 1 may be defined as shown in Table 2 below.

TABLE 2

|  | Scenarios A and B | Scenarios C and D |
| --- | --- | --- |
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g., UE) at the minimum elevation angle | 40,581 km | 1,932 km (altitude of 600 km)<br>3,131 km (altitude of 1,200 km) |
| Maximum round trip delay (RTD)<br>(only propagation delay) | Scenario A: 541.46 ms<br>(service and feeder links)<br>Scenario B: 270.73 ms (only service link) | Scenario C: (transparent payload: service and feeder links)<br>−5.77 ms (altitude of 600 km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum delay variation within a single beam | 16 ms | 4.44 ms (altitude of 600 km)<br>6.44 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3 GPP | |
| Feeder link | Radio interfaces defined in 3GPP or non-3GPP | |

In addition, in the scenarios defined in Table 1, delay constraints may be defined as shown in Table 3 below.

TABLE 3

|  | Scenario A | Scenario B | Scenario C1-2 | Scenario D1-2 |
| --- | --- | --- | --- | --- |
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Hereinafter, timing synchronization methods for a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In places where it is not easy to install terrestrial base stations, such as mountainous area, desert area, island area, ocean, or remote area, a cellular shadow area may occur. Meanwhile, when various disasters such as earthquakes, tsunamis, wars, etc. occur and terrestrial networks do not operate normally, problems such as service interruption and communication interruption may occur even in places where cellular services were previously provided.

Meanwhile, in the NTN, a base station or a relay station may be mounted on a non-terrestrial communication node (e.g., airborne platform such as airship, satellite, etc.). The NTN may provide communication services to the ground or air through the base station or relay station mounted on the non-terrestrial communication node. In the case of NTN, communication services can be provided even in places where it is not easy to install terrestrial base stations, such as mountainous area, desert area, island area, ocean, or remote area. The NTN may provide hyper-connection communication services. In addition, in the case of NTN, even when a disaster occurs on the ground, it can help maintain individual survival and safety by providing communication services from the air or outer space to the ground.

Meanwhile, in a mobile communication network, a propagation delay of signals between each terminal and a base station may vary due to a different position of each terminal. In order to reduce interference due to different propagation delays of terminals, a timing advance (TA) procedure may be used. In particular, in the NTN, a round trip time delay (RTT) between a terminal and a base station may be large, and a difference between RTT values corresponding to the respective terminals may be large. A large RTT value may affect various procedures for signal transmission and reception. In addition, in the NTN, Doppler shifts due to movements of non-terrestrial communication nodes such as satellites may appear large.

In a long-distance communication network having a large RTT value and a large Doppler shift, such as the NTN, if a TA procedure for each terminal is not properly performed, communication performance may be deteriorated. For example, when a difference between RTT values (or propagation delays) of the terminals is large, interference may occur between uplink transmissions or downlink transmissions. Accordingly, a timing synchronization operation for matching uplink and downlink timings may be required between the base station and the terminals.

Meanwhile, in a long-distance communication network in which radio resources are limited, when signaling overhead such as a lot of control parameters occurs for a TA procedure with high accuracy, communication performance may be deteriorated. Accordingly, a technique for reducing the signaling overhead while improving accuracy in the TA procedure in the long-distance communication network may be required.

Figure 4:
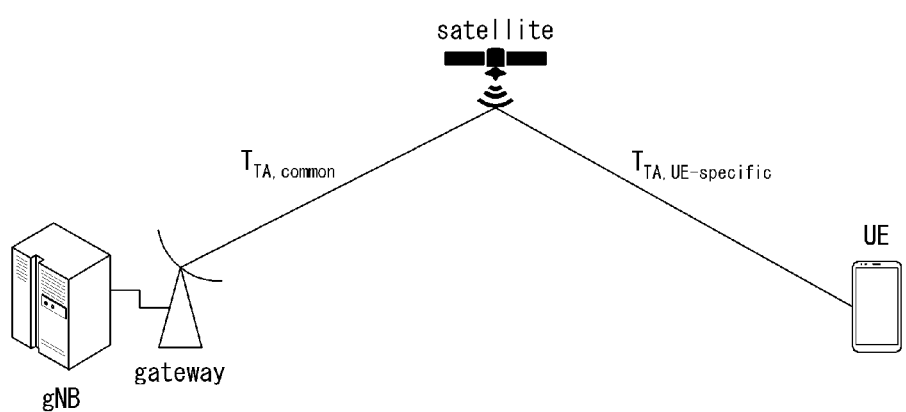
FIG. 4 is a conceptual diagram for describing a first exemplary embodiment of a timing synchronization method in a communication system.

FIG. 4 is a conceptual diagram for describing a first exemplary embodiment of a timing synchronization method in a communication system.

Referring to FIG. 4, a communication system may be configured to include an NTN and/or a terrestrial network. For example, the communication system may include an NTN configured to provide services to a predetermined coverage, including one or more satellites and one or more gateways. Here, the NTN may be the same as or similar to at least one of the first and second exemplary embodiments of the NTN described with reference to FIGS. 1 and 2. The one or more satellites and the one or more gateways included in the NTN may be the same as or similar to the satellites 110, 211, and 212 and the gateways 130 and 230 described with reference to FIGS. 1 and 2. Meanwhile, the communication system may include a terrestrial network configured to provide services to a predetermined coverage, including one or more terrestrial cells. In the present disclosure, a base station, a satellite, a terminal, and the like may be referred to as a 'communication node', respectively.

The communication system may include one or more base stations. Each of the one or more base stations may be a terrestrial base station or a non-terrestrial base station. The non-terrestrial base station may correspond to any one of the satellites described with reference to FIGS. 1 to 3. Alternatively, the non-terrestrial base station may be an aerial base station (e.g., a UAV on-board base station (UBS)) mounted on an aerial vehicle such as airship or unmanned aerial vehicle (UAV). Here, the base station may be a concept including a gateway.

In order for uplink transmissions from different terminals within a cell not to interfere with each other, uplink intra-cell orthogonality (or uplink orthogonality) may need to be maintained. In order to maintain the uplink orthogonality, when uplink signals transmitted by the terminals are received by the base station, slot boundaries of the respective signals may need to be time-aligned. For example, a timing alignment error between the uplink signals received by the base station may be within a cyclic prefix (CP) range. For such the timing alignment, a timing synchronization operation may be performed to adjust an uplink transmission timing of each terminal based on a position of each terminal obtained through a satellite navigation service, etc., a position (or azimuth, ephemeris, etc.) of a serving satellite of each terminal, a predetermined TA value, and/or the like.

First Exemplary Embodiment of Communication System

In the first exemplary embodiment of the communication system, the communication system may be configured to include an NTN. For example, the communication system may be the same as or similar to the communication system described with reference to FIG. 4. Hereinafter, in describing the first exemplary embodiment of the communication system, content overlapping with those described with reference to FIGS. 1 to 4 may be omitted.

In an exemplary embodiment of the communication system including an NTN, a TA value for each terminal may be calculated as in Equation 1.

$$T_{TA} = (N_{TA} N_{TA,UE\text{-}specific} + N_{TA,common} + N_{TA,offset}) \times T_C \quad \text{[Equation 1]}$$

In Equation 1, $N_{TA,common}$ and $N_{TA,UE\text{-}specific}$ may be calculated as in Equation 2 below.

$$T_{TA,common} = N_{TA,common} \times T_C$$

$$T_{TA,UE\text{-}specific} = N_{TA,UE\text{-}specific} \times T_C \quad \text{[Equation 2]}$$

In Equations 1 and 2, $N_{TA}$ may be defined or updated based on a TA command (TAC) (e.g., $T_A$) indicated by the base station to each terminal. For example, in a physical random access channel (PRACH), an initial value of $N_{TA}$ may be defined as 0. The base station may transmit a TAC to each terminal through a MsgB in a 4-step random access (RA) procedure, Msg2 in a 2-step RA procedure, a media access control (MAC) control element (CE), and/or the like. The RA procedure may be referred to as a 'random access channel (RACH) procedure'. Each terminal may update the value of $N_{TA}$ based on the TAC received from the base station in the RA procedure. $N_{TA,common}$ or $T_{TA,common}$ may mean a 'network-controlled common TA' or 'common TA'. The common TA may include a timing offset value that the base station or network determines necessary for TA adjustment. For example, the common TA may correspond to an RTT value on a feeder link (e.g., a link between a satellite and a gateway). The common TA may be determined based on the position or ephemeris of a serving satellite of each terminal. Meanwhile, $N_{TA,UE\text{-}specific}$ or $T_{TA,UE\text{-}specific}$ may mean a 'terminal-specific (or, UE-specific) TA'. The terminal-specific TA may correspond to an RTT value on a service link for each terminal (e.g., a link between each terminal and the satellite). Each terminal may estimate the terminal-specific TA by itself. $T_{TA,offset}$ may mean a fixed offset value used for TA calculation. $T_C$ may be a predetermined constant value defined for TA calculation. For example, $T_C$ may be 0.509 ns.

In an exemplary embodiment of the communication system, the TA value (i.e., $T_{TA}$) may need to be continuously updated. The terminal may assume that an RTT between the terminal and the base station is not the same as an initial TA value calculated for MsgA (or Msg1) in the RA procedure. The base station or the network may set a predetermined effective time for the satellite ephemeris data or the common TA determined based on the satellite ephemeris data. In other words, previously-acquired satellite ephemeris data may be applied only for the maximum time (i.e., the set effective time) during which the previously-acquired satellite ephemeris data can be applied without additional acquisition of satellite ephemeris data.

In each terminal, $N_{TA}$ may be updated based on information of a TAC (or TAC field information) included in the MsgB, Msg2, MAC CE, and/or the like transmitted from the base station. For example, when TAC information (i.e., $T_A$) is received from the base station through a TAC field of MsgB or Msg2, the terminal may update $N_{TA}$ as in Equation 3.

$$N_{TA} = N_{TA,old} \times T_A \cdot 16 \cdot 64 / 2^\mu \quad \text{[Equation 3]}$$

In Equation 3, $N_{TA,old}$ may mean a previous (or old) $N_{TA}$. That is, the terminal may update $N_{TA}$ by multiplying $T_A$ received from the base station by a predetermined value $16 \cdot 64 / 2^\mu$ and adding it to the previous $N_{TA}$ (i.e., $N_{TA,old}$). Here, $2^\mu$ may be determined based on a subcarrier spacing (SCS). For example, $2^\mu$ may be determined as shown in Table 4.

TABLE 4

| u | $2^u$ | SCS ($2^u \times 15$ kHz) |
|---|---|---|
| 0 | 1 | 15 kHz |
| 1 | 2 | 30 kHz |
| 2 | 4 | 60 kHz |
| 3 | 8 | 120 kHz |
| 4 | 16 | 240 kHz |

Meanwhile, when TAC information (i.e., $T_A$) is received from the base station through a TAC field of MAC CE, the terminal may update $N_{TA}$ as in Equation 4.

$$N_{TA} = N_{TA,old} \times (T_A - 31) \cdot 16 \cdot 64/2^u \quad \text{[Equation 4]}$$

That is, the terminal may update $N_{TA}$ by subtracting 31 from $T_A$ received from the base station, multiplying it by a predetermined value $16 \cdot 64/2^u$, and adding it to the previous $N_{TA}$ (i.e., $N_{TA,old}$).

The common TA may include a parameter indicating a timing drift (hereinafter, referred to as a timing drift parameter) or may be applied based on the timing drift parameter. For example, when a timing drift parameter is provided from the base station (or network), the terminal may apply a common TA based on the timing drift parameter.

A result of uplink timing synchronization between the terminal and the base station may be evaluated based on a predetermined uplink timing error requirement. For example, the error of the result of uplink timing synchronization between the terminal and the base station may need to be within the uplink timing error requirement. Here, when the uplink timing error requirement is defined, a difference (or offset) between the common TA according to the parameter provided by the base station (or network) and an actual RTT on the feeder link may not be considered.

In order to improve timing synchronization (or timing relationship) between the base station and the terminal, a scheduling offset (e.g., K_offset) may be used. K_offset may be informed through system information (SI) or configured through SI. K_offset may be used in an initial access process of the terminal to the base station. In this case, configuration of a cell-specific K_offset used for all beams of at least one cell may be supported. Meanwhile, in addition to K_offset, a separate scheduling offset (e.g., K_mac) for MAC CEs may be defined.

When timings of downlink and uplink frames of the terminal are aligned with respect to the base station (e.g., gNB), K_mac may be not required for operations (or assumption) of the terminal with respect to downlink and uplink configurations indicated through a MAC CE command on a physical downlink shared channel (PDSCH). On the other hand, when timings of downlink and uplink frames are not aligned with respect to the base station, K_mac may be required for operations (or assumption) of the terminal with respect to downlink configuration indicated through a MAC CE command on a PDSCH, and K_mac may not be required for operations (or assumption) of the terminal with respect to uplink configuration indicated through a MAC CE command on a PDSCH. K_mac may be included in SI. The base station (or network) may provide K_mac to the terminal through SI or the like. If K_mac is not provided, the terminal may assume that K_mac is 0.

After the terminal initially accesses the base station, update of K_offset may be performed. For example, the terminal may supplement an uplink transmission timing adjustment operation by applying K_offset to a TAC received from the base station. Here, a terminal-specific (or, UE-specific) K_offset configured and provided by the base station (or network) may be used. The base station (or network) may provide or update the terminal-specific K_offset to the terminal through a MAC CE.

Meanwhile, a cell-specific K_offset may be configured through SI. The cell-specific K_offset may be configured as follows.

Option 1-1) The cell-specific K_offset may be signaled as one offset value. For example, a value of K_offset may include an RTT on the service link and an RTT between the serving satellite and a predetermined reference point (RP).

Option 1-2) The cell-specific K_offset may be composed of a first offset value and a second offset value. For example, the first offset value may be determined based on the common TA or RTT between the serving satellite and the RP. The second offset value may correspond to the RTT on the service link. The cell-specific K_offset may be defined as a sum of the first offset value and the second offset value.

When K_offset other than K_offset (e.g., cell-specific K_offset) signaled through SI is not provided, K_offset signaled through SI may be applied to all timing synchronization improvement procedures between the terminal and the base station.

The RTT between the terminal and the base station may be estimated to be equal to or close to a sum of the TA of the terminal and K_mac. Here, the TA of the terminal may correspond to $T_{TA}$. The RTT between the base station and the satellite or the RTT on the feeder link may be estimated to be equal to or close to a sum of $T_{TA,common}$ (i.e., $N_{TA,common} \times T_C$) and K_mac.

The ephemeris in the communication system including an NTN may be classified into ephemeris of the serving cell (or serving satellite) and ephemeris of a neighboring cell (or neighboring satellite). In the earth-fixed NTN scenario, a service link switching procedure may be performed due to a satellite change, a beam change, or the like. In the service link switching procedure, information on when the serving satellite (or serving cell) terminates services for the corresponding region, and/or timing information (e.g., timer information, absolute time information, etc.) on the neighboring satellite (or neighboring cell, target satellite/cell, upcoming satellite/cell, etc.) may be required. As described above, the information required for the service link switching procedure may be identified based on SI and/or ephemeris.

For timing synchronization for uplink and/or the like, the terminal may report a terminal-specific TA or terminal-specific TA pre-compensation information to the base station. For example, the terminal may report information on a terminal-specific TA to the base station in the RA procedure through a MAC CE or a separately defined signal. The terminal-specific TA reported by the terminal to the base station may be included in the 'terminal-specific TA pre-compensation'. The operation in which the terminal reports the terminal-specific TA or the terminal-specific TA pre-compensation information to the base station may be referred to as a 'terminal-specific (or UE-specific) TA reporting'. The base station (or network) may activate or deactivate the terminal-specific TA reporting within the RA procedure. For example, the base station may indicate whether to activate or deactivate the terminal-specific TA reporting through SI.

When the terminal-specific TA reporting is activated, the terminal may perform the terminal-specific TA reporting through a message (e.g., Msg1, Msg3, Msg5, etc.) using a MAC CE in the RA procedure. The terminal-specific TA reporting may be supported in a connected mode (e.g., radio resource control (RRC) connected mode). For the terminal-specific TA reporting, a predetermined event trigger may be designated. Based on the event trigger, the terminal may perform terminal-specific TA reporting to a cell to be accessed (e.g., target cell) during the RA procedure.

Under a working assumption that information on the position of the terminal cannot be reported in the connected mode, the terminal-specific TA reported in the connected mode may include the terminal-specific TA pre-compensation information. On the other hand, under a working assumption that information on the position of the terminal can be reported in the connected mode, the terminal-specific TA reported in the connected mode may include at least one of the terminal-specific TA pre-compensation information or the information on the position of the terminal. The terminal-specific TA reporting may be performed through RRC signaling or MAC CE, etc., based on the working assumption and/or the content of the reporting in the connected mode.

An exemplary embodiment of the communication system may not support aperiodic position reporting performed based on DCI or the like. As a working assumption, the base station may configure or indicate terminal position reporting based on an event trigger to update the position of the terminal in the RRC connected mode. Meanwhile, the base station may configure or indicate periodic position reporting to update the position of the terminal in the RRC connected mode.

In the quasi-earth-fixed NTN scenario, when a cell stops services for a specific region, timing information on a service interruption time may need to be signaled to support cell reselection. The timing information on the service interruption time may be broadcast to terminals through SI. In an exemplary embodiment of the communication system, broadcasting related to the service interruption time may be applied to a quasi-earth-fixed cell and may not be applied to a moving cell. In the quasi-earth-fixed NTN scenario, the information on the service interruption time may be used to determine when to perform measurements on neighboring cells. In the quasi-earth-fixed cell, information on a reference position (RP) of the cell (such as serving cell or adjacent cell) may be broadcast through SI. Here, the RP of the cell may correspond to a center of the cell.

In the quasi-earth-fixed cell, before stopping services for a specific region currently covered by the serving cell (or serving satellite), the terminal in the corresponding region may need to start measuring neighboring cells (or neighboring satellites). The quasi-earth-fixed cell may instruct the terminal to start the measurement on neighboring cells before the service interruption of the serving cell. In the quasi-earth-fixed cell, it may be assumed that the service link switch procedure means L3 mobility. For example, if SSBs are at the same sync raster point, PCIs thereof may be different.

Second Exemplary Embodiment of Communication System

In the second exemplary embodiment of the communication system, the communication system may be configured to include an NTN. For example, the communication system may be the same as or similar to the communication system described with reference to FIG. 4. Hereinafter, in describing the second exemplary embodiment of the communication system, content overlapping with those described with reference to FIGS. 1 to 4 and the first exemplary embodiment of the communication system may be omitted.

In an exemplary embodiment of the communication system including an NTN, the terminal-specific TA reporting procedure during the RA procedure may be activated or deactivated by SI. The terminal may perform terminal-specific TA reporting based on a predetermined event trigger. For example, an event trigger for reporting information on a terminal-specific TA in the RRC connected mode may be supported. Here, the event trigger may be configured based on a TA value. For example, the event trigger may be defined as a TA offset threshold value corresponding to the TA value. The TA offset threshold may be determined between the current terminal-specific TA and the last successfully-reported terminal-specific TA. When the event trigger is configured, the terminal may perform the terminal-specific TA reporting when a condition corresponding to the configured event trigger is satisfied. Meanwhile, when the RA procedure is triggered due to beam switching or service link switching, the terminal-specific TA reporting may not be performed.

Table 5 shows examples of options of information included in the terminal-specific TA report.

TABLE 5

| Option number | Information included in terminal-specific TA information |
|---|---|
| Option 2-1 | Information on $N_{TA,UE\text{-}specific}$ estimated by the terminal |
| Option 2-2 | Information on $N_{TA,sum} = (N_{TA} + N_{TA,UE\text{-}specific})$ estimated by the terminal |
| Option 2-3 | Information on $T_{TA}$ estimated by the terminal |
| Option 2-4 | Information on an amount of change in $N_{TA,UE\text{-}specific}$ estimated by the terminal |
| Option 2-5 | Information on an amount of change in $N_{TA,sum}$ estimated by the terminal |
| Option 2-6 | Information on an amount of change in $T_{TA}$ estimated by the terminal |

Referring to Table 2, the terminal-specific TA information may include information based on at least one of Options 2-1 to 2-6.

Option 2-1) Information on $N_{TA,UE\text{-}specific}$ estimated by the terminal: The terminal may report information corresponding to $N_{TA,UE\text{-}specific}$ estimated by the terminal to the base station through the terminal-specific TA reporting. Here, $N_{TA,UE\text{-}specific}$ may be the same as or similar to that described with reference to Equation 1.

Option 2-2) Information on $N_{TA,sum}=(N_{TA}+N_{TA,UE\text{-}specific})$ estimated by the terminal: The terminal may report information corresponding to $N_{TA,sum}$ estimated by the terminal to the base station through the terminal-specific TA reporting. Here, $N_{TA}$ and $N_{TA,UE\text{-}specific}$ may be the same as or similar to those described with reference to Equation 1.

Option 2-3) Information on $T_{TA}$ estimated by the terminal: The terminal may report information corresponding to $T_{TA}$ estimated by the terminal to the base station through the terminal-specific TA reporting. Here, $T_{TA}$ may be the same as or similar to that described with reference to Equation 1.

Option 2-4) Information on an amount of change in $N_{TA,UE\text{-}specific}$ estimated by the terminal: The terminal may report information corresponding to an amount of change in $N_{TA,UE\text{-}specific}$ estimated by the terminal to the base station through the terminal-specific TA reporting. For example, the terminal may report information on a difference between $N_{TA,UE\text{-}specific}$ estimated at a time point n at which the previous terminal-specific TA reporting is performed and $N_{TA,UE\text{-}specific}$ estimated at a time point n+1 at which the terminal intends to perform the terminal-specific TA reporting. The information reported in Option 2-4 may be determined based on one or more of Equations 5 to 7.

$$N_{TA,UE\text{-}specific,dff(n)} = N_{TA,UE\text{-}specific,n+1} - N_{TA,UE\text{-}specific,n} \quad \text{[Equation 5]}$$

$$N_{TA,UE\text{-}specific,dff(n-1)} = N_{TA,UE\text{-}specific,n} - N_{TA,UE\text{-}specific,n-1} \quad \text{[Equation 6]}$$

$$N_{TA,UE\text{-}specific,\Delta dff(n)} = N_{TA,UE\text{-}specific,dff(n)} - N_{TA,UE\text{-}specific,dff(n-1)} \quad \text{[Equation 7]}$$

Option 2-4 may be divided into Option 2-4-A and Option 2-4-B based on Equations 5 to 7.

Option 2-4-A) Based on Equation 5, the terminal may report information corresponding to $N_{TA,UE\text{-}specific,dff(n)}$ which is a difference between $N_{TA,UE\text{-}specific,n}$, estimated at the previous reporting time point and $N_{TA,UE\text{-}specific,n+1}$ estimated at the current reporting time point.

Option 2-4-B) Based on Equations 5 to 7, the terminal may report information corresponding to $N_{TA,UE\text{-}specific,\Delta dff(n)}$, which is a difference between $N_{TA,UE\text{-}specific,dff(n-1)}$ estimated at the previous reporting time point and $N_{TA,UE\text{-}specific,dff(n)}$ estimated at the current reporting time point.

Option 2-5) Information on an amount of change in $N_{TA,sum}$ estimated by the terminal: The terminal may report information corresponding to an amount of change in $N_{TA,sum}$ estimated by the terminal to the base station through the terminal-specific TA reporting. For example, the terminal may report information on a difference between $N_{TA,sum}$, which is estimated at a time point n at which the previous terminal-specific TA reporting is performed, and $N_{TA,sum}$, which is estimated at a time point n+1 at which the terminal intends to perform the terminal-specific TA reporting. Similarly to that described with reference to Option 2-4, Option 2-5 may be divided into Option 2-5-A and Option 2-5-B.

Option 2-5-A) The terminal may report information corresponding to $N_{TA,sum,dff(n)}$, which is a difference between $N_{TA,sum,n}$ estimated at the previous reporting time point and $N_{TA,sum,n+1}$ estimated at the current reporting time point.

Option 2-5-B) the terminal may report information corresponding to $N_{TA,sum,\Delta dff(n)}$, which is a difference between $N_{TA,sum,dff(n-1)}$ estimated at the previous reporting time point and $N_{TA,sum,dff(n)}$ estimated at the current reporting time point.

Option 2-6) Information on an amount of change in $T_{TA}$ estimated by the terminal: The terminal may report information corresponding to an amount of change in $T_{TA}$ estimated by the terminal to the base station through the terminal-specific TA reporting. For example, the terminal may report information on a difference between $T_{TA}$ estimated at a time point n at which the previous terminal-specific TA reporting is performed and $T_{TA}$ estimated at a time point n+1 at which the terminal intends to perform the terminal-specific TA reporting. Similarly to that described with reference to Option 2-4, Option 2-6 may be divided into Option 2-6-A and Option 2-6-B.

Option 2-6-A) The terminal may report information corresponding to $T_{TA,dff(n)}$, which is a difference between $T_{TA,n}$ estimated at the previous reporting time point and $T_{TA,n+1}$ estimated at the current reporting time point.

Option 2-6-B) The terminal may report information corresponding to $T_{TA,\Delta dff(n)}$, which is a difference between $T_{TA,dff(n-1)}$ estimated at the previous reporting time point and $T_{TA,dff(n)}$ estimated at the current reporting time point.

The terminal may report the determined value itself to the base station as in Option 2-1 to Option 2-6. Alternatively, the terminal may report a value obtained by converting the determined value as in Options 2-1 to 2-6 according to a subcarrier spacing (SCS). For example, the terminal may report a value obtained by multiplying $T_{A,UL} \cdot 16 \cdot 64/2^\mu$, $(T_{A,UL}-31) \cdot 16 \cdot 64/2^\mu$ to $N_{TA,UE\text{-}specific}$ determined as in Option 2-1. Here, $T_{A,UL}$ may indicate a unit for the SCS, and may be 0 or a natural number.

Meanwhile, the terminal may perform terminal-specific TA reporting in the same or different manners for the serving cell and the target cell. Here, the target cell may correspond to a satellite having the same or different cell ID as the satellite of the serving cell. For example, the terminal may perform terminal-specific TA reporting based on Option 2-4 for the serving cell, and may perform terminal-specific TA reporting based on Option 2-1 for the target cell.

Third Exemplary Embodiment of Communication System

In the third exemplary embodiment of the communication system, the communication system may be configured to include an NTN. For example, the communication system may be the same as or similar to the communication system described with reference to the second exemplary embodiment of the communication system. Hereinafter, in describing the third exemplary embodiment of the communication system, content overlapping with those described with reference to FIGS. 1 to 4 and the first and second exemplary embodiments of the communication system may be omitted.

In an exemplary embodiment of the communication system including an NTN, the terminal may perform terminal-specific TA reporting to the base station. Here, the terminal may determine an application time of $T_{TA}$, which is a TA value calculated by the terminal at a time point at which the terminal-specific TA reporting is performed. For example, the terminal may determine the application time of $T_{TA}$ based on at least one of the following Options 3-1 to 3-2.

Option 3-1) Based on the time point at which the terminal-specific TA reporting is performed: The terminal may determine the application time of $T_{TA}$ based on the time point at which the terminal-specific TA reporting is performed. For example, the terminal may apply $T_{TA}$ from a first slot following a slot $n_1$ in which the terminal-specific TA reporting is performed. Alternatively, the terminal may apply $T_{TA}$ from a first slot following a slot $n_1+3N_{slot}^{subframe,\mu}+K\_mac$. Meanwhile, if information on a predetermined application time is indicated by a feedback or command received from the base station, the terminal may apply $T_{TA}$ at the indicated time. For example, the terminal may compare K_offset at the time point at which the terminal-specific TA reporting is performed with $T_{TA}$ K_mac calculated at the time point at which the terminal-specific TA reporting is performed. If $T_{TA}+K\_mac>K\_offset$, the terminal may change K_offset to have a minimum value greater than $T_{TA}+K\_mac$. Here, if the terminal receives information on an updated K_offset from the base station through a MAC CE, the terminal may replace the existing K_offset with the updated K_offset.

Option 3-2) Based on a time point at which a feedback for the terminal-specific TA reporting is received: The terminal may receive a feedback or response message for the terminal-specific TA reporting from the base station, and determine the application time of $T_{TA}$ based on a time point determined as a time point at which the terminal-specific TA reporting has been successfully performed. For example, the terminal may apply $T_{TA}$ from a first slot following a slot $n_2$ in which the feedback for the terminal-specific TA reporting is received. Alternatively, the terminal may apply $T_{TA}$ from a first slot following a slot $n_2$++K_offset. That is, it may be seen that the previously applied $T_{TA}$ is applied between the slot $n_1$ and the slot $n_2$.

Meanwhile, the base station may update information on $T_{TA}$ based on the content of the terminal-specific TA report received from the terminal. Here, the base station may perform an operation such as at least one of the following Options 3-3 to 3-7 when the terminal performs the terminal-specific TA reporting through a MAC CE instead of a message according to the RA procedure.

Option 3-3) The base station may transmit a hybrid automatic repeat request acknowledgment (HARQ-ACK) response (e.g., ACK) for the received terminal-specific TA report to the terminal.

Option 3-4) The base station may transmit a signal requesting transmission of an RA preamble for TA information update to the terminal.

Option 3-5) The base station may transmit a signal requesting to perform terminal position reporting based on an event trigger to the terminal.

Option 3-6) The base station may estimate and update information such as the position of the terminal using satellite ephemeris, GNSS, etc., and based on the updated information, the base station may transmit a signal requesting to perform terminal-specific TA reporting again to the terminal.

Option 3-7) The base station may transmit updated SI to the terminal. Here, the updated SI may include information or parameters related to K_offset, common TA, and the like.

Figure 5:
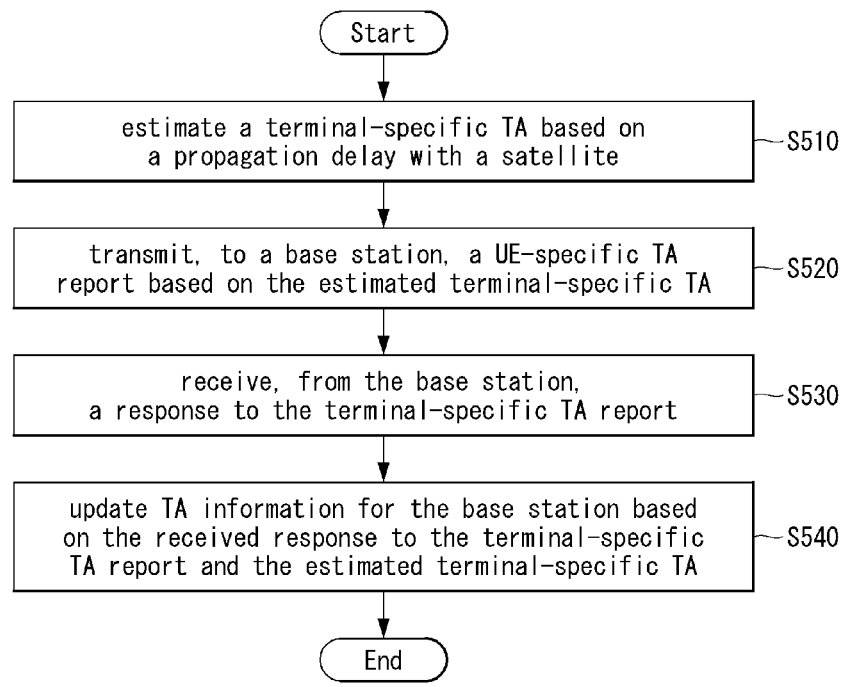
FIG. 5 is a flowchart illustrating a second exemplary embodiment of a timing synchronization method in a communication system.

FIG. 5 is a flowchart illustrating a second exemplary embodiment of a timing synchronization method in a communication system.

Referring to FIG. 5, a communication system may be configured to include an NTN. For example, the communication system may be the same as or similar to the communication system described with reference to FIG. 4. Communication nodes constituting the communication system may operate based on at least some of the operations described with reference to the second exemplary embodiment of the communication system and the third exemplary embodiment of the communication system. Hereinafter, in describing the second exemplary embodiment of the timing synchronization method with reference to FIG. 5, the content overlapping with those described with reference to FIGS. 1 to 4 and the first to third exemplary embodiments of the communication system may be omitted.

In an exemplary embodiment of the communication system including an NTN, the terminal may measure information on a terminal-specific TA based on a delay time with a satellite (S510). The terminal may perform terminal-specific TA reporting to a base station connected through the satellite based on the information on the terminal-specific TA measured in step S510 (S520). In step S520, the terminal-specific TA reporting may be performed based on at least one of Options 2-1 to 2-6 described with reference to the second exemplary embodiment of the communication system.

The base station may identify the contents of the terminal-specific TA report received in step S520 and may transmit a response to the UE-specific TA report to the terminal. Here, the response to the terminal-specific TA report, which is transmitted by the base station, may be configured based on at least one of Options 3-3 to 3-7 described with reference to the third exemplary embodiment of the communication system.

The terminal may receive the response to the terminal-specific TA report, which is transmitted from the base station (S530). The terminal may update TA information for the base station based on the response to the terminal-specific TA report received in step S530 and/or information on the terminal-specific TA estimated in step S510. Here, the TA information update operation of the terminal may be performed based on at least one of Options 3-1 and 3-2 described with reference to the third exemplary embodiment of the communication system.

Fourth Exemplary Embodiment of Communication System

In the fourth exemplary embodiment of the communication system, the communication system may be configured to include an NTN. For example, the communication system may be the same as or similar to the communication system described with reference to the third exemplary embodiment of the communication system. Hereinafter, in describing the fourth exemplary embodiment of the communication system, content overlapping with those described with reference to FIGS. 1 to 4 and the first to third exemplary embodiments of the communication system may be omitted.

In the NTN forming a cell via a terrestrial base station and a satellite (or other non-terrestrial communication node), a service link switching procedure may be performed. The service link switching procedure may be performed due to a change of the non-terrestrial communication node such as the satellite connecting the base station and a terminal, or a change of a beam. For example, in an exemplary embodiment of the service link switching procedure, the service link may be switched by replacing the satellite with another satellite in a state where the base station to which the terminal is connected remains the same (in other words, in a state in which a physical cell ID (PCI) remains the same). Alternatively, in another exemplary embodiment of the service link switching procedure, the service link may be switched by changing a beam that the satellite serves to the terminal while the base station and the satellite to which the terminal is connected remains the same.

When the service link switching is performed due to the change of the satellite, a signaling procedure may be required for information (hereinafter, first information) on when the satellite (hereinafter, serving satellite) to which the terminal is previously connected terminates services for the corresponding region or the terminal and/or timing information (e.g., timer information, absolute time information) (hereinafter, second information) for a satellite (hereinafter, target satellite) to replace the serving satellite.

When the service link switching procedure is performed, the base station and the terminal may operate based on at least one of the following Options 4-1 to 4-3.

Option 4-1) RA procedure: When the service link switching procedure is performed due to a change of the satellite, the base station may trigger an RA procedure of the terminal to the target satellite. The base station and the terminal may transmit and receive the first information and/or the second information through messages transmitted and received in the RA procedure.

Option 4-2) TA update procedure: Before the service of the serving satellite is terminated, the terminal may receive, from the base station, information on a time point $n_3$ at which the service of the serving satellite is terminated, information (or ephemeris, coordinates, etc.) on the position of the target satellite, and/or information on a common TA (e.g., $N_{TA,common}$) for the target satellite. The terminal may estimate TA information for the target satellite (e.g., $T_{TA}=(N_{TA}+N_{TA,UE\text{-}specific}+N_{TA,common}+N_{TA,offset})\times T_C$) based on the time point $n_3$. For example, the terminal may estimate terminal-specific TA information for the target satellite (e.g., $N_{TA,UE\text{-}specific}$) based on the coordinates of the target satellite and the position of the terminal between the time point $(n_3-X)$ and the time point $n_3$. Here, $N_{TA,UE\text{-}specific}$ for the target satellite (hereinafter, $N_{TA,UE\text{-}specific,new}$) may be calculated based on an RTT on a service link with the target satellite. The terminal may update $T_{TA}$ based on the obtained or estimated information for the target satellite. The terminal may update $T_{TA}$ based on information of $N_{TA,common}$ for the target satellite (hereinafter, $N_{TA,common,new}$), which is received from the base station, and information on the estimated $N_{TA,UE\text{-}specific,new}$. Here, the terminal may apply $N_{TA,common,new}$ and $N_{TA,UE\text{-}specific,new}$ at a time point $n_4$ configured after the time point $n_3$. After the time point $n_4$, the terminal may receive information on $N_{TA}$ for the target satellite (hereinafter, $N_{TA,new}$) from the base station. From the time point $n_4$ until the terminal receives information on $N_{TA,new}$ from the base station, the terminal may set $N_{TA}$ to 0 in the equation of calculating $T_{TA}$. When information on $N_{TA,new}$ is received from the base station, the terminal may update $N_{TA}$ and $T_{TA}$ based on the received information on $N_{TA,new}$. Meanwhile, the terminal may perform terminal-specific TA reporting based on information on the estimated $N_{TA,UE\text{-}specific,new}$.

Option 4-3) Beam switching procedure: When the service link switching procedure is performed due to a beam change (or beam failure), a new service link may be configured based on a beam failure recovery (BFR) procedure triggered due to the beam failure. At least some of the operations according to Option 4-3 may be the same as or similar to the operations according to Option 4-1 and/or Option 4-2.

For example, the BFR procedure may include an RA procedure. The terminal may update TA information (i.e., $T_{TA}$) based on a time point $n_5$ of transmitting an RA preamble in uplink in the RA procedure. The terminal may update $T_{TA}$ at a time point $n_6$ configured after the time point $n_5$. The terminal may update $T_{TA}$ based on information acquired or estimated through the BFR procedure. Here, if a beam-specific parameter exists in the common TA information (e.g., $N_{TA,common}$), the terminal may update $N_{TA,common}$ in the equation for calculating $T_{TA}$, based on a common TA (e.g., $N_{TA,common,beam}$) for a beam selected through a beam switching procedure. Alternatively, the terminal may use the value of $N_{TA,common}$ used before the beam failure occurs as it is. When the service link switching procedure is performed due to a beam change, terminal-specific TA reporting may not be performed.

Figure 6:
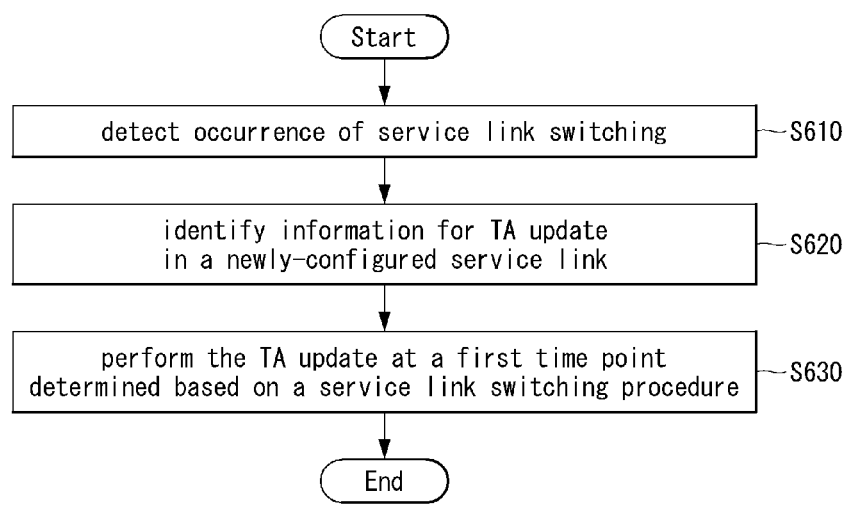
FIG. 6 is a flowchart illustrating a third exemplary embodiment of a timing synchronization method in a communication system.

FIG. 6 is a flowchart illustrating a third exemplary embodiment of a timing synchronization method in a communication system.

Referring to FIG. 6, a communication system may be configured to include an NTN. For example, the communication system may be the same as or similar to the communication system described with reference to FIG. 4. Communication nodes constituting the communication system may operate based on at least some of the operations described with reference to the fourth exemplary embodiment of the communication system and the third exemplary embodiment of the communication system. Hereinafter, in describing the third exemplary embodiment of the timing synchronization method with reference to FIG. 6, the content overlapping with those described with reference to FIGS. 1 to 4 and the first to fourth exemplary embodiments of the communication system may be omitted.

In the exemplary embodiment of the communication system including an NTN, the terminal may detect occurrence of a service link switching procedure in which a service link connecting a base station and the terminal is switched (S610). Here, the service link switching procedure may refer to a procedure (hereinafter, service link switching procedure according to a satellite change) in which a satellite (hereinafter, serving satellite) to which the terminal is previously connected is replaced with another satellite (hereinafter, target satellite) to configure a service link through the target satellite. In this case, the terminal may detect the occurrence of the service link switching procedure according to the satellite change by receiving a signal indicating that the serving satellite is to be replaced with the target satellite. On the other hand, the service link switching procedure may refer to a procedure (hereinafter, service link switching procedure according to a beam change) in which a beam failure occurs in a beam constituting the service link between the satellite and the terminal, and thus a new service link is configured by a new beam determined through a beam failure recovery (BFR) procedure. In this case, when the occurrence of beam failure is identified, the terminal may determine that the service link switching procedure according to a beam change has occurred.

The terminal may identify information for TA update in the newly configured service link according to the service link switching procedure (S620). The terminal may perform the TA update at a first time point determined based on the service link switching procedure (S630). Here, when the service link switching procedure according to the satellite change occurs, the terminal may perform the operations according to steps S620 and S630 based on at least one of Options 4-1 and 4-2 described with reference to the fourth exemplary embodiment of the communication system. On the other hand, when the service link switching procedure according to the beam change occurs, the terminal may perform the operations according to steps S620 and S630 based on Option 4-3 described with reference to the fourth exemplary embodiment of the communication system.

According to the exemplary embodiments of the method and apparatus for timing synchronization in a communication system, even when a propagation delay on a feeder link and/or a service link in an NTN is very large, a timing synchronization procedure between a base station and a terminal can be efficiently performed. Through this, in the communication system including the NTN, communication quality deterioration due to interference due to the large propagation delay and Doppler shifts due to fast movements of satellites, etc. can be alleviated, whereby the performance of the communication system can be improved.

However, the effects that can be achieved by the timing synchronization method and apparatus in the communication system according to the exemplary embodiments of the present disclosure are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a terminal in a communication system, comprising:
   estimating a propagation delay between the terminal and a first satellite, the first satellite being connected to the terminal and a base station of the communication system;
   estimating a terminal-specific timing advance (TA) value based on the propagation delay;
   transmitting, to the base station, a terminal-specific TA report based on the terminal-specific TA value; and
   performing update of a first TA value for communication with the base station based on the terminal-specific TA value,
   wherein a time point at which the update of the first TA value is performed is determined based on a first response of the base station to the terminal-specific TA report.

2. The operation method according to claim 1, wherein the terminal-specific TA report includes at least one of information on the terminal-specific TA value, information on a sum of the terminal-specific TA value and a second TA value updated based on a timing advance command (TAC) received from the base station, information on the first TA value updated based on the terminal-specific TA value, or combinations thereof.

3. The operation method according to claim 1, wherein information on the terminal-specific TA value includes at least one of information on an amount of change in the terminal-specific TA value, information on an amount of change in a sum of the terminal-specific TA value and a second TA value updated based on a TAC received from the base station, and information on an amount of change in the first TA value updated based on the terminal-specific TA value, or combinations thereof.

4. The operation method according to claim 1, wherein the time point at which the update of the first TA value is performed corresponds to a second time point spaced apart by a preset first offset value from a first time point at which the first response is received.

5. The operation method according to claim 1, wherein the time point at which the update of the first TA value is performed is determined based on a result of comparing a sum of the updated first TA value and a second offset for a medium access control (MAC) control element (CE) with a third offset indicated by the first response.

6. The operation method according to claim 1, wherein the first response includes at least one of a first signal indicating whether the terminal-specific TA report is normally received, a second signal requesting transmission of a random access (RA) preamble for the update of the first TA value, a third signal requesting to perform update of the terminal-specific TA value and to perform new terminal-specific TA reporting based on the updated terminal-specific TA value, or combinations thereof.

7. The operation method according to claim 1, wherein the time point at which the update of the first TA value is performed corresponds to a second slot spaced apart by a first offset from a first slot in which the first response is received from the base station.

8. The operation method according to claim 1, further comprising, after performing the update:
   receiving a fourth signal indicating that the first satellite is to be replaced by a second satellite connected to the base station;
   estimating a target terminal-specific TA value between the second satellite and the terminal; and
   performing update of the first TA value for communication with the base station based on the target terminal-specific TA value,
   wherein the fourth signal includes at least one of information on a first time point at which a service of the first satellite for the terminal is terminated, information for timing synchronization with the second satellite, or combinations thereof.

9. An operation method of a terminal in a communication system, comprising:
   receiving a first signal indicating that a first satellite connected to the terminal and a base station of the communication system is to be replaced by a second satellite connected to the base station;

estimating a propagation delay between the second satellite and the terminal;
estimating a terminal-specific timing advance (TA) value based on the propagation delay; and
performing update of a first TA value for communication with the base station based on the terminal-specific TA value,
wherein the first signal includes at least one of information on a first time point at which a service of the first satellite for the terminal is terminated or information for timing synchronization with the second satellite, and the update of the first TA value is performed at a second time point determined based on the first signal.

10. The operation method according to claim 9, wherein the first signal includes information on the first time point, and the second time point at which the update of the first TA value is performed is configured after the first time point identified based on the first signal.

11. The operation method according to claim 9, wherein the first signal includes information for timing synchronization with the second satellite, the information for timing synchronization with the second satellite includes information on a position of the second satellite, and the estimating of the terminal-specific TA value comprises:
estimating the propagation delay between the second satellite and the terminal based on the information on the position of the second satellite; and
estimating the terminal-specific TA value based on the propagation delay.

12. The operation method according to claim 9, wherein the first signal includes information for timing synchronization with the second satellite, the information for timing synchronization with the second satellite includes information on a second common TA value for the second satellite which is distinguished from a first common TA value for the first satellite, and the performing update of the first TA value comprises: updating the first TA value based on the second common TA value and the terminal-specific TA value.

13. The operation method according to claim 9, wherein the first TA value is determined based on at least the terminal-specific TA value and a second TA value updated based on a timing advance command (TAC) received from the base station, and the performing update of the first TA value comprises:
setting the second TA value to 0 at the second time point;
receiving a first TAC from the base station;
updating the second TA value based on the received first TAC; and
performing update of the first TA value based on the terminal-specific TA value and the updated second TA value.

14. A terminal in a communication system, comprising:
a processor, wherein the processor causes the terminal to:
identify a beam failure with respect to a first beam configuring a first service link between the terminal and a first satellite connected to a base station of the communication system;
configure a second service link between the first satellite and the terminal for communication with the base station through a beam failure recovery (BFR) procedure according to the identified beam failure; and
perform update of a first TA value for communication with the base station based on information obtained through the BFR procedure,
wherein the update of the first TA value is performed at a first time point determined based on the BFR procedure.

15. The terminal according to claim 14, wherein the BFR procedure includes a random access (RA) procedure, and the first time point is determined to be after a second time point at which the terminal transmits a first preamble in uplink according to the RA procedure.

16. The terminal according to claim 14, wherein the first TA value is determined based at least on information on a common TA value provided from the base station, the information on the common TA value includes information on a beam-specific parameter, and in the performing of the update of the first TA value, the processor causes the terminal to:
identify a parameter corresponding to a second beam configuring the second service link from the information on the beam-specific parameter;
update the common TA value based on the parameter corresponding to the second beam; and
update the first TA value based on the updated common TA value.

17. The terminal according to claim 14, wherein the first TA value is determined based at least on information on a common TA value provided from the base station, and in the performing of the update of the first TA value, the processor causes the terminal to:
estimate a common TA value for the second service link to be identical to a common TA value for the first service link; and
calculate the first TA value based on the information obtained through the BFR procedure and the common TA value for the second service link.

* * * * *